(12) United States Patent
Senegas et al.

(10) Patent No.: US 9,684,961 B2
(45) Date of Patent: Jun. 20, 2017

(54) SCAN REGION DETERMINING APPARATUS

(71) Applicant: KONINKLIJKE PHILIPS N.V., Eindhoven (NL)

(72) Inventors: Julien Senegas, Hamburg (DE); Axel Saalbach, Hamburg (DE); Martin Bergtholdt, Hamburg (DE); Thomas Netsch, Hamburg (DE); Peter Mazurkewitz, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 84 days.

(21) Appl. No.: 14/768,236

(22) PCT Filed: Feb. 26, 2014

(86) PCT No.: PCT/IB2014/059248
§ 371 (c)(1),
(2) Date: Aug. 17, 2015

(87) PCT Pub. No.: WO2014/136017
PCT Pub. Date: Sep. 12, 2014

(65) Prior Publication Data
US 2016/0012586 A1 Jan. 14, 2016

Related U.S. Application Data

(60) Provisional application No. 61/773,429, filed on Mar. 6, 2013.

(51) Int. Cl.
*G06T 7/00* (2017.01)
*G06K 9/62* (2006.01)
*G06T 7/73* (2017.01)

(52) U.S. Cl.
CPC .......... *G06T 7/0014* (2013.01); *G06K 9/6269* (2013.01); *G06T 7/74* (2017.01);
(Continued)

(58) Field of Classification Search
CPC ....... G06T 3/0068; G06T 7/0014; G06T 7/11; G06T 7/174; G06T 7/30; G06T 7/74;
(Continued)

(56) References Cited

U.S. PATENT DOCUMENTS 6,195,409 B1 2/2001 Chang et al. .................. 378/20
2002/0198447 A1 12/2002 Van Muiswinkel et al. . 600/410
(Continued)

FOREIGN PATENT DOCUMENTS

| GB | 2472142 A | 1/2011 |
|---|---|---|
| WO | 2009017715 A1 | 2/2009 |
| WO | 2012075577 A1 | 6/2012 |

OTHER PUBLICATIONS

Ballard, D. H.; Geneeralizing the Hough Transform to Detect Arbitrary Shapes; 1981; Pattern Recognition; 13(2) 111-122.
(Continued)

*Primary Examiner* — Andrew W Johns

(57) ABSTRACT

The invention relates to a scan region determining apparatus (12) for determining a scan region of a subject to be scanned by a scanning system (10) like a computed tomography system. A spatial transformation defining a registration of an overview image and a template image with respect to each other is determined, wherein initially the overview image and the template image are registered by using an element position indicator being indicative of a position of an element of the subject with respect to the overview image. A template scan region is defined with respect to the template image, wherein a final scan region is determined by projecting the template scan region onto the overview image by using the determined spatial transformation. The registration and thus the determination of the spatial transformation are very robust, which improves the quality of determining the final scan region.

20 Claims, 4 Drawing Sheets

(52) U.S. Cl.
CPC ............... *G06T 2207/10081* (2013.01); *G06T 2207/10104* (2013.01)

(58) Field of Classification Search
CPC ........ G06T 2207/20128; A61B 5/0037; A61B 6/469; A61B 6/488; A61B 6/545; A61B 2034/107

See application file for complete search history.

(56) References Cited

U.S. PATENT DOCUMENTS

| | | | | |
|---|---|---|---|---|
| 2008/0071163 | A1* | 3/2008 | Zhang et al. ................. | 600/410 |
| 2009/0010505 | A1 | 1/2009 | Cocosco et al. ............. | 382/128 |
| 2009/0290776 | A1 | 11/2009 | Sun et al. .................... | 382/131 |
| 2015/0182117 | A1* | 7/2015 | Senegas et al. ..... | A61B 5/0037 600/410 |

OTHER PUBLICATIONS

Ding, F., et al.; Segmentation of 3D CT Volume Images Using a Single 2D Atlas; 2005; CVBIA LNCS; 3765:459-468.

Felzenszwalb, R., et al.; Object Detection with Discriminatively Trained Part Based Models; 2010; IEEE Trans. on Pattern Analysis and Machine Intelligence; 32(9)1627-1645.

Itti, L., et al.; Automatic Scan Prescription for Brain MRI; 2001; MRM; 45:486-494.

Viola, P., et al.; Rapid Object Detection Using a Boosted Cascade of Simple Features; 2001; CVPR; 1:511-518.

Viola, P., et al.; Robust Real-time Object Detection; 2001; IJCV; pp. 1-25.

Young, S., et al.; Automated planning of MRI neuro scans; 2006; Proc. of SPIE; 6144:6144M1-6144M8.

Zhan, Y., et al.; Auto-alignment of Knee MR Scout Scans through Redundant, Adaptive and Hierarchical Anatomy Detection; 2011; IPMI-LNCS; 6801:111-122.

* cited by examiner

SCAN REGION DETERMINING APPARATUS

CROSS REFERENCE TO RELATED APPLICATIONS

This application is a national filing of PCT application Serial No. PCT/IB2014/059248, filed Feb. 26, 2014, published as WO 2014/136017 A1 on Sep. 12, 2014, which claims the benefit of U.S. provisional application Ser. No. 61/773,429 filed Mar. 6, 2013, which is incorporated herein by reference.

FIELD OF THE INVENTION

The invention relates to a scan region determining apparatus, a scan region determining method and a scan region determining computer program for determining a scan region of a subject to be scanned by a scanning system. The invention relates further to a training apparatus, a training method and a training computer program for training the scan region determining apparatus and to a scanning system, a scanning method and a scanning computer program for scanning a region of the subject.

BACKGROUND OF THE INVENTION

US 2009/0290776 A1 discloses a system for automatically determining a field of view for performing a subsequent medical imaging study. The system comprises a medical imaging device for acquiring one or more two-dimensional localizer images and for performing a subsequent three-dimensional medical imaging study. The system further comprises a body mask generation unit for thresholding the localizer images and identifying a largest connected component, a boundary mask obtaining unit for obtaining a boundary mask from the boundary of the generated body mask and a field of view determining unit for fitting a rectangular bounding box to the obtained boundary mask, wherein the determined field of view is used by the medical imaging device for performing the subsequent medical image study. This determination of the field of view may not be reliable, especially if the localizer images show different objects and a field of view should be determined with respect to a certain one of these objects. The determination technique used by the system may therefore lack robustness.

SUMMARY OF THE INVENTION

It is an object of the present invention to provide a scan region determining apparatus, a scan region determining method and a scan region determining computer program for determining a scan region of a subject to be scanned by a scanning system, which allows for a more robust determination of the scan region. It is a further object of the present invention to provide a training apparatus, a training method and a training computer program for training the scan region determining apparatus and a scanning system, a scanning method and a scanning computer program for scanning a scan region of a subject.

In a first aspect of the present invention a scan region determining apparatus for determining a scan region of a subject to be scanned by a scanning system is presented, wherein the scan region determining apparatus comprises:

an overview image providing unit for providing an overview image of a subject, an element position indicator determination unit for determining an element position indicator being indicative of a position of an element of the subject to be scanned, wherein the element position indicator determination unit is adapted to determine the element position indicator with respect to and based on the overview image, a template image providing unit for providing a template image of a template subject, which corresponds to the subject to be scanned, and for providing a template scan region including a template element, which corresponds to the element of the subject to be scanned, wherein the template image providing unit is adapted to provide a template scan region, which is defined with respect to the template image, a spatial transformation determination unit for determining a spatial transformation defining a registration of the overview image and the template image with respect to each other, wherein initially the overview image and the template image are registered by using the determined element position indicator being indicative of the position of the element of the subject to be scanned with respect to the overview image, a scan region determination unit for determining a final scan region by projecting the template scan region onto the overview image by using the determined spatial transformation.

Since the spatial transformation determination unit determines a spatial transformation defining a registration of the overview image and the template image with respect to each other, wherein initially the overview image and the template image are registered by using the determined element position indicator being indicative of the position of the element of the subject to be scanned with respect to the overview image, a good initialization for the registration of the overview image and the template image with respect to each other is provided, which significantly reduces the probability of the registration procedure to be trapped in a local minimum. The registration and thus the determination of the spatial transformation are therefore very robust and allow for a robust determination of the final scan region by projecting the template scan region onto the overview image by using the determined spatial transformation. Moreover, since the registration of the overview image and the template image with respect to each other is well initialized based on the determined element position indicator being indicative of the position of the element of the subject to be scanned with respect to the overview image, the determination of the spatial transformation and hence of the final scan region can be relatively fast.

The scanning system is preferentially a computed tomography system and the overview image is preferentially a two-dimensional projection image of the subject, which may also be regarded as being a localizer image. Moreover, the scan region is preferentially a plan box. The subject is preferentially a living being like a person or an animal and the element to be scanned is preferentially an organ or another element of the living being. The overview image preferentially shows the element to be scanned and at least a surrounding part of the subject.

The element position indicator determination unit is preferentially adapted to determine at least the center of the element in the overview image as the element position indicator. The element position indicator determination unit can be adapted to determine further element position indicators like an intermediate scan region enclosing the element to be scanned and centered on the determined center of the element.

If the element position indicator determination unit determines at least the center of the element in the overview image as an element position indicator, the registration between the template image and the overview image can be initialized by superposing the center of the template image with the determined center of the element in the overview image. Moreover, if the element position indicator determination unit also determines an intermediate scan region centered on the determined center of the element in the overview image, wherein the intermediate scan region includes the element in the overview image, the intermediate scan region may be compared with the template scan region or with another reference region provided by the template image providing unit, in order to determine a scaling parameter and/or a rotational parameter, which can additionally be used for providing an initial registration of the template image with respect to the overview image.

The scan region is preferentially a plan box defined on the overview image, i.e. the intermediate scan region, the template scan region and the final scan region can all be rectangular boxes, particularly two-dimensional boxes, defined on the overview image. In particular, the element position indicator determination unit can be adapted to determine a bounding box including the element and being centered on the determined center of the element in the overview image as the intermediate scan region.

The intermediate scan region is preferentially a rough estimation of a region of the overview image including the element to be scanned, in particular, including the organ to be scanned. This rough estimation provides initial coordinates, which can be regarded as being initial coordinates of the final scan region and which can be used as a start for registering the template image and the overview image with respect to each other.

The template image can be an overview image showing the template subject with the template element. The template image can also be an atlas, in particular, a statistical atlas. For instance, the template image can represent the statistical mean or median intensity and shape of typical overview images showing the template subject within the template image.

The template subject corresponds to the subject to be scanned, if they are of the same kind, i.e., if, for example, the template subject is a person and also the subject to be scanned is a person and not, for instance, an animal. The template element corresponds to the element of the subject to be scanned, if they are of the same kind. For instance, if the element to be scanned is a certain organ, the template element is the same organ, i.e., for example, if the element is the heart of a certain person then the template element is a template heart, which may have been generated by investigating several images of hearts of different persons. The template image and the overview image can show the same part of the subject or the entire subject. However, preferentially the template image shows a smaller region of the subject, in particular, a region around the template element. This region is preferentially a bit larger than the region covered by the template element such that typical image features are shown in the template image, which are generally also visible in the overview image. The template image can also show parts of the template element that are not shown in the overview image, for instance, in cases where the overview image does not cover entirely the target element.

The scan region determining apparatus can be adapted to determine a single scan region for a single element like a single organ of the subject and/or the scan region determining apparatus can be adapted to determine several scan regions for several elements like several organs of the subject. If the scan region determining apparatus is adapted to determine several scan regions for several elements of the subject, the overview image providing unit is adapted to provide an overview image showing the different elements of the subject and the element position indicator determination unit is adapted to determine several element position indicators, wherein each element position indicator is indicative of a position of a respective element of the subject to be scanned and wherein the several element position indicators are determined with respect to and based on the overview image showing the several elements. The template image providing unit is adapted to provide several template images of the template subject, which correspond to the actual subject, wherein each template image shows the respective element, and to provide several template scan regions for the several template images, which are defined with respect to the several template images. Furthermore, in this example the spatial transformation determination unit is adapted to determine several spatial transformations defining registrations of the overview image and the respective template image with respect to each other, wherein initially the overview image and the respective template image are registered based on the element position indicator, which has been determined for the respective element and which is indicative of the position of the respective element of the subject to be scanned with respect to the overview image. Thus, in this example for each template image a spatial transformation is determined, which defines the registration of the overview image and the respective template image with respect to each other. The scan region determination unit is adapted to determine several final scan regions by projecting the several template scan regions onto the overview image by using the respective determined spatial transformations.

If the scan region determining apparatus has determined several final scan regions for several elements shown in the overview image, the scan region determining unit can be adapted to perform a consistency check. In particular, the scan region determination unit can be adapted to apply consistency rules to the determined final scan regions, in order to determine whether the final scan regions are consistent. The consistency rules can define spatial relationships between the elements, which have to be reflected by the final scan regions. For example, if the elements shown in the overview image are chest, abdomen and pelvis, the consistency rules can define that the chest scan region should be above the abdomen scan region and that the abdomen scan region should be above the pelvis scan region with respect to the foot-head direction. Similarly, gaps and overlaps between these scan regions can be minimized in a consistent way. For example, if there is a gap between two final scan regions, which are preferentially boxes, that, for instance according to the consistency rules, should be adjacent, each final scan region can be extended by half of the gap size such that the two final scan regions join each other. Similarly, if there is an overlap between two final scan regions that should be adjacent, each final scan region can be reduced in size by half of the overlap size such that the two final scan regions join each other.

The overview image providing unit can be a storing unit in which the overview image of the subject is stored already or a receiving unit for receiving the overview image from, for instance, an overview image generating device. Moreover, the overview image providing unit can also be adapted to generate the overview image based on detection values received from a scanning apparatus comprising, for instance, a radiation source and a detection device, wherein the scanning apparatus is adapted to provide detection values being indicative of the radiation after having traversed the subject.

Also the template image providing unit can be a storing unit, wherein the storing unit may comprise the template image and the template scan region and may be adapted to provide the stored template image and template scan region. The template image providing unit can be also a receiving unit for receiving the template image and the template scan region from another device.

It is also preferred that the element position indicator determination unit is adapted to use a Viola-Jones algorithm for determining the element position indicator, in particular, the center of the element in the overview image and the intermediate scan region including the element to be scanned. The Viola-Jones algorithm has preferentially been trained by using a database of training overview images, in which a training scan region, which may have been added by hand, is already present. In the training overview images the training scan regions enclose the respective element, for instance, the respective organ, or a portion of the respective element. The Viola-Jones algorithm is very fast, for instance, it may require only a few milliseconds on a standard personal computer, thereby further increasing the speed of determining the scan region.

It is further preferred that the element position indicator determination unit is adapted to a) use an element position indicator determination algorithm for determining the element position indicator, b) provide element position indicator determination rules for selecting a most likely element position indicator, if the element position indicator determination algorithm revealed several possible element position indicators, and c) apply the element position indicator determination rules to the determined several possible element position indicators for determining the element position indicator to be used by the spatial transformation unit. For instance, the element position indicator determination unit can be adapted to determine for each element position indicator a score, wherein the element position indicator determination rules can defined that the element position indicator with the highest score should be selected. The score can be a direct outcome of the element position indicator determination algorithm. The score can also be determined in another way. For example, it can be determined depending on a grouping of spatially adjacent element position indicators. The score is, for instance, a probability or confidence value. Using the element position indicator determination rules can improve the accuracy of the determination of the element position indicator.

In an embodiment the spatial transformation determination unit is adapted to apply an intensity based registration algorithm to the overview image and the template image for determining the spatial transformation, wherein the image intensity based registration algorithm is initialized based on the determined element position indicator being indicative of the position of the element of the subject to be scanned with respect to the overview image. Image intensity based registration algorithms like a registration algorithm based on a cross correlation of the overview image and the template image are rather robust with respect to some degree of dissimilarity between the two images, which may be present in case of image artifacts, metal implants, unusual patient positioning, et cetera. Using an intensity based registration algorithm can therefore further improve the robustness of the determination of the scan region.

The template image providing unit can provide the template scan region in different ways. For instance, the template scan region can be directly defined as a real region on the template image. In this case the projection of the template scan region onto the overview image can be performed by directly projecting this real region on the template image onto the overview image. However, the template image providing unit can provide the template scan region also in another way. For instance, in the template image one or several template indicator elements like anatomical landmarks or the full contour of the template element can be defined, wherein the template scan region can be defined with respect to the one or several template indicator elements by using, for instance, corresponding template rules. In this case the template scan region, which is defined in this way, can be projected onto the overview image by projecting the one or several template indicator elements, which actually define the template scan region together with the template rules, onto the overview image, wherein the projected template scan region is defined by the projected one or several template indicator elements and the template rules.

Thus, in a preferred embodiment the template image providing unit is adapted to provide a position of a template indicator element in the template image, wherein the template scan region is defined with respect to the position of the template indicator element, and wherein the scan region determination unit is adapted to project the template scan region onto the overview image by transforming the position of the template indicator element by using the determined spatial transformation and determining the template scan region on the overview image based on the transformed position of the template indicator element. The template image providing unit can be adapted to provide several positions of several template indicator elements in the template image, which may be regarded as being landmarks, wherein the template scan region can be defined with respect to these positions of the several indicator elements.

The template scan region can be defined with respect to the one or several template indicator elements by using corresponding template rules. For instance, if the element to be scanned is the brain, the template indicator elements may be the most posterior part of the skull, the most inferior part of the skull, the most left part of the skull and the most right part of the skull, wherein the template rules can define the template scan region with respect to these landmarks. For example, the template scan region can be a template scan box, wherein the template rules can define that the upper side of the template scan box is positioned a predefined distance a above the most posterior part of the skull, the lower side of the template scan box is positioned a predefined distance b below the most inferior part of the skull, the left side of the template scan box is positioned a predefined distance c left to the most left part of the skull, and the right side of the template scan box is positioned a predefined distance d right to the most right part of the skull.

As already mentioned above, the template image providing unit can also be adapted to provide the template scan region by directly defining a real region on the template image, i.e. coordinates of the template scan region, in particular, of a template box, can be defined with respect to the template image, i.e. in a template image space. In this case the scan region determination unit can be adapted to transform the coordinates of the template scan region defined in the template image space into an overview image space, in order to project the template scan region onto the overview image, thereby determining the final scan region.

In a further aspect of the present invention a training apparatus for training a scan region determining apparatus is presented, wherein the training apparatus comprises:

a training images providing unit for providing training images of a subject comprising an element and for providing training scan regions including the element of the subject in the training images, a training unit for training the element position indicator determination unit based on the provided training images and training scan regions.

In another aspect of the present invention a scanning system for scanning a scan region of a subject is presented, wherein the scanning system comprises:

a scan region determining apparatus for determining the scan region as defined in claim 1, and a scanning apparatus for scanning a part of the subject defined by the determined scan region.

In a further aspect of the present invention a scan region determining method for determining a scan region of a subject to be scanned by a scanning system is presented, wherein the scan region determining method comprises:

providing an overview image of a subject by an overview image providing unit, determining an element position indicator being indicative of a position of an element of the subject to be scanned by an element position indicator determination unit, wherein the element position indicator determination unit determines the element position indicator with respect to and based on the overview image, providing a template image of a template subject, which corresponds to the subject to be scanned, and providing a template scan region including a template element, which corresponds to the element of the subject to be scanned, by a template image providing unit, wherein the template image providing unit provides a template scan region, which is defined with respect to the template image, determining a spatial transformation defining a registration of the overview image and the template image with respect to each other by a spatial transformation determination unit, wherein initially the overview image and the template image are registered by using the determined element position indicator being indicative of the position of the element of the subject to be scanned with respect to the overview image, determining a final scan region by projecting the template scan region onto the overview image by using the determined spatial transformation by a scan region determination unit.

In another aspect of the present invention a training method for training the scan region determining apparatus as defined in claim 1 is presented, wherein the training method comprises:

providing training images of a subject comprising an element and providing training scan regions including the element of the subject in the training images by a training images providing unit, training the element position indicator determination unit based on the provided training images and training scan regions by a training unit.

In a further aspect of the present invention a scanning method for scanning a scan region of a subject is presented, wherein the scanning method comprises:

determining the scan region as defined in claim 10 by a scan region determining apparatus as defined in claim 1, and scanning a part of the subject defined by the determined scan region by a scanning apparatus.

In another aspect of the present invention a scan region determining computer program for determining a scan region of a subject to be scanned by a scanning system is presented, wherein the scan region determining computer program comprises program code means for causing a scan region determining apparatus as defined in claim 1 to carry out the steps of the scan region determining method as defined in claim 10, when the scan region determining computer program is run on a computer controlling the scan region determining apparatus.

In a further aspect of the present invention a training computer program for training a scan region determining apparatus as defined in claim 1 is presented, wherein the training computer program comprises program code means for causing a training apparatus as defined in claim 8 to carry out the steps of the training method as defined in claim 11, when the training computer program is run on a computer controlling the training apparatus.

In another aspect of the present invention a scanning computer program for scanning a scan region of a subject is presented, wherein the scanning computer program comprises program code means for causing a scanning system as defined in claim 9 to carry out the steps of the scanning method as defined in claim 12, when the scanning computer program is run on a computer controlling the scanning system.

It shall be understood that the scan region determining apparatus of claim 1, the training apparatus of claim 8, the scanning system of claim 9, the scan region determining method of claim 10, the training method of claim 11, the scanning method of claim 12, the scan region determining computer program of claim 13, the training computer program of claim 14 and the scanning computer program product of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
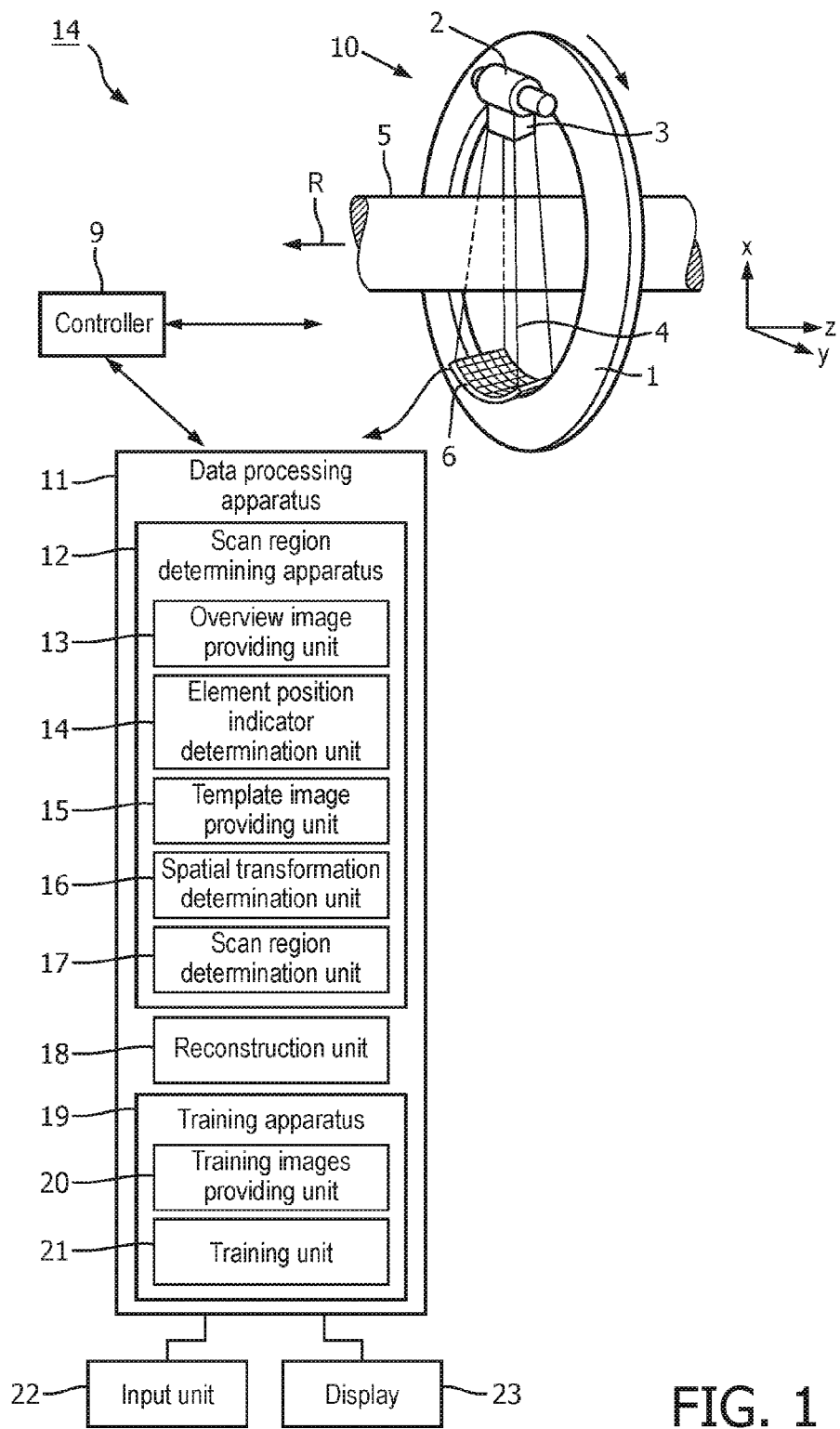
FIG. 1 shows schematically and exemplarily an embodiment of a scanning system for scanning a scan region of a subject.

FIG. 1 shows schematically and exemplarily a scanning system for scanning a region of a subject. In this embodiment the scanning system 10 is a computed tomography system. The computed tomography system 10 comprises a gantry 1 which is capable of rotation around a rotational axis R which extends parallel to a z direction. A radiation source 2, which is an x-ray tube, is mounted on the gantry 1. The radiation source 2 is provided with a collimator 3, which forms, in this embodiment, a conical radiation beam 4 from the radiation generated by the radiation source 2. The radiation traverses a subject (not shown) such as a patient within an examination zone 5, which is cylindrical in this embodiment. After having traversed the examination zone 5 the radiation beam 4 is incident on a detection device 6, which comprises a two-dimensional detection surface. The detection device 6 is also mounted on the gantry 1. In another embodiment the collimator 3 can also be adapted to form another beam shape, for instance, a fan beam, wherein the detection device 6 can comprise a detection surface, which is shaped corresponding to the other beam shape, in particular to the fan beam.

The gantry 1 is rotatable around the examination zone 5 and the subject is movable along the z direction such that the radiation source and the subject can be moved with respect to each other such that the radiation source 2 is moved along, for instance, a helical, circular or linear trajectory with respect to the subject.

Figure 5:
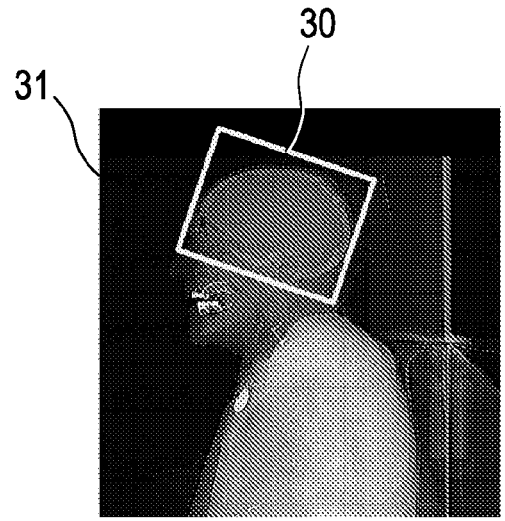
FIG. 5 shows schematically and exemplarily a final scan region on the overview image.

The gantry 1 with the radiation source 2 and the detection device 6 form a scanning apparatus 14, which is controlled by a controller 9. The scanning apparatus 14 can be controlled such that an overview image of the subject is generated. In this embodiment the overview image is a two-dimensional projection image 31, which is schematically and exemplarily shown in FIGS. 2, 3 and 5. The overview image 31, which may also be regarded as being a localizer image, can be generated, for instance, by generating detection values depending on the radiation incident on the detection surface of the detection device 6, while the radiation source 2 is linearly moved parallel to the z direction with respect to the subject, wherein the detection values can be provided to an overview image providing unit 13 of a scan region determining apparatus 12, which generates the overview image based on the detection values. In this embodiment the scan region determining apparatus 12, which is adapted to determine a scan region of the subject, is incorporated in a data processing apparatus 11.

Figure 3:
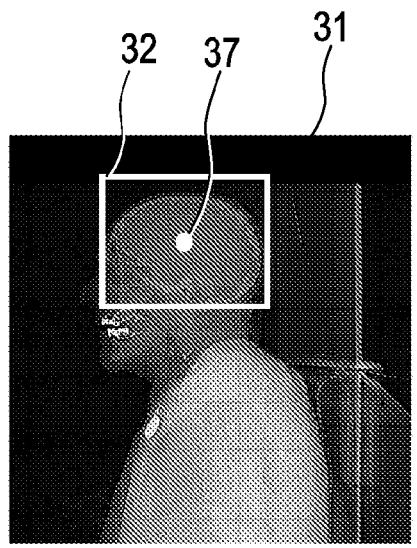
FIG. 3 shows schematically and exemplarily an intermediate scan region on the overview image.

The scan region determining apparatus 12 further comprises an element position indicator determination unit 14 for determining a center of an element of the subject to be scanned and an intermediate scan region 32, which includes the element of the subject to be scanned, which is centered on the determined center of the element and which is schematically and exemplarily shown in FIG. 3. The element position indicator determination unit 14 is adapted to determine the intermediate scan region 32 with respect to and based on the overview image 31. Moreover, the scan region determining apparatus comprises a template image providing unit 15 for providing a template image 33 of a template subject, which corresponds to the subject to be scanned. The template image 33 is schematically and exemplarily shown in FIG. 4.

Figure 4:
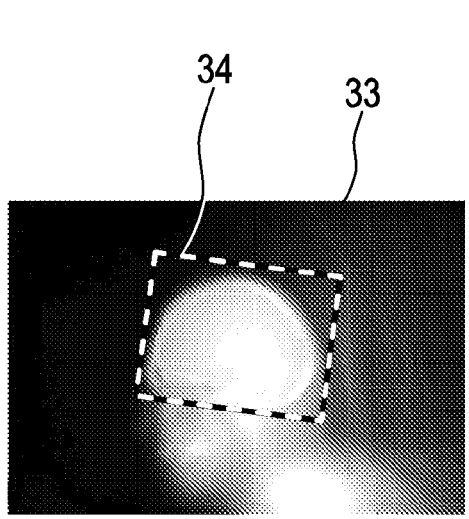
FIG. 4 shows schematically and exemplarily a template image with a template scan region.

The template image providing unit 15 is further adapted to provide a template scan region 34, which is also schematically and exemplarily shown in FIG. 4 and which includes a template element, which corresponds to the element of the subject to be scanned. The template image providing unit 15 is adapted to provide a template scan region 34, which is defined with respect to the template image 33.

The scan region determining apparatus 12 further comprises a spatial transformation determination unit 16 for determining a spatial transformation defining a registration of the overview image 31 and the template image 33 with respect to each other, wherein initially the overview image 31 and the template image 33 are registered based at least on the determined center of the element of the subject to be scanned with respect to the overview image and preferentially also based on the determined intermediate scan region. A scan region determination unit 17 then determines a final scan region 30, which is schematically and exemplarily shown in FIG. 5, by projecting the template scan region 34 onto the overview image 31 by using the determined spatial transformation.

In this embodiment the intermediate scan region, the template scan region and the final scan region are boxes and can be regarded as being plan boxes. Moreover, in this embodiment the subject is a person and the element to be scanned is the brain.

The element position indicator determination unit 14 provides a rough estimation of a region of the overview image 31, which includes the brain. This rough estimation provides initial coordinates, which can be regarded as being initial coordinates of the final scan region and which can be used as a start for registering the template image 33 and the overview image 31 with respect to each other. In order to provide this rough estimation, in this embodiment the element position indicator determination unit 14 is adapted to determine the center of the brain in the overview image 31 and to determine the intermediate scan region 32 such that it is centered on the determined center of the brain. Preferentially, the scan region determination unit 14 is adapted to use a Viola-Jones algorithm for determining the center of the brain and the intermediate scan region 32 including the brain to be scanned. Thus, after the acquisition of the localizer image an organ localization technique is applied to find the approximate center of the target organ being the brain in this embodiment as well as the approximate extent of a bounding box. This provides the initial coordinates of the scan region, i.e. the finally desired plan box, which will be refined by the scan region determination unit 17. A broad range of techniques can be employed for determining these initial coordinates. However, a Viola-Jones like approach for object localization based on classification is preferred.

Figure 2:
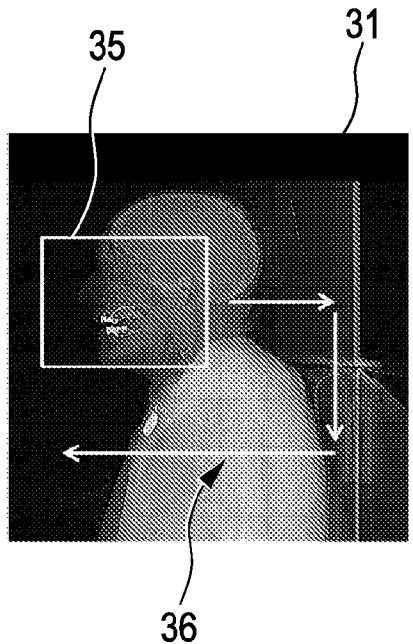
FIG. 2 illustrates schematically and exemplarily a sliding-window technique for finding an element in an overview image.

While applying the Viola-Jones algorithm the overview image 31 is analyzed in a sliding-window manner as indicated in FIG. 2 by the box 35 and the arrows 36 to find positive subsets of the overview image 31 that match the target anatomy being, in this embodiment, the anatomy of the brain. For more details regarding the known Viola-Jones algorithm reference is made to the articles "Rapid Object Detection using a Boosted Cascade of Simple Features" by P. A. Viola and M. J. Jones, CVPR (1), pages 511 to 518, IEEE Computer Society (2001) and "Robust Real-Time Face Detection" by P. A. Viola and M. J. Jones, International Journal of Computer Vision 57 (2), pages 137 to 154 (2004), which are herewith incorporated by reference.

The approximate center 37 of the brain and the box 32 determined by the Viola-Jones algorithm are schematically and exemplarily shown in FIG. 3. The box 32 shown in FIG. 3 indicates the intermediate scan region.

The element position indicator determination unit 14 can be adapted to provide element position indicator determination rules for selecting a most likely intermediate scan region centered on a respective determined center of the element, if the Viola-Jones algorithm, which can be regarded as being an element position indicator determination algorithm, revealed several possible intermediate scan regions. The element position indicator determination unit 14 can further be adapted to apply the element position indicator determination rules to the determined several possible intermediate scan regions for determining the intermediate scan region to be used by the spatial transformation unit 16. Thus, in case that multiple candidates for the element, which may be a target organ and which is the brain in this embodiment, are found, simple rules can be applied to find the most likely position, i.e. find the most likely center and bounding box, and to rule out false positive findings. In this embodiment the element position indicator determination rules define that, if several intermediate scan regions centered on respective centers of the element have been determined by the element position indicator determination unit 14, the intermediate scan region is selected, which has the highest score. The score is preferentially a probability or confidence value and may be an outcome of the element position indicator determination algorithm. However, the score may also not be an output of the element position indicator determination algorithm, but may be determined by the element position indicator determination unit 14 depending on, for instance, a grouping of spatially adjacent determined intermediate scan regions.

The element position indicator determination rules can be used to determine a score, which may be a discrete score or a continuous score, depending on features extracted from the respective intermediate scan region. The element position indicator determination rules can be defined by training a classifier like a SVM classifier, a k-NN classifier, a decision trees classifier, a stumps classifier, et cetera. The element position indicator determination unit can also be adapted to find several most likely intermediate scan regions centered on respective determined centers of the element, wherein these intermediate scan regions can be aggregated and the aggregated intermediate scan region can be used for the subsequent steps.

The spatial transformation determination unit 16 is adapted to apply an intensity based registration algorithm to the overview image 31 and the template image 33 for determining the spatial transformation, wherein the intensity based registration algorithm is initialized based on the determined element position indicator, i.e. in this embodiment at least based on the determined center of the element. Thus, an intensity based registration algorithm is applied to find the spatial transformation that maps the template image of the target anatomy, i.e. of the brain and some surrounding parts of a person, to the actual overview image, wherein the registration algorithm is initialized with a position parameter defined by the determined center of the element and optionally further parameters like scale parameters and/or rotation parameters, which may be obtained from the intermediate scan region. The intensity based registration algorithm preferentially accounts for translation, rotation and scaling along the two image directions. Alternatively, rigid registration or elastic registration algorithms can be applied. The registration algorithm can use, for instance, a cross correlation operation for finding the spatial transformation.

The spatial transformation determination unit 16 is preferentially adapted to initially register the overview image and the template image with respect to each other by centering the template image on the determined center of the element, which has been determined with respect to the overview image. Additionally, the intermediate scan region can be compared with the template scan region or with another reference region provided by the template image providing unit 15, wherein a scaling parameter and/or a rotation parameter may be determined based on this comparison. The scaling parameter and/or rotation parameter may be applied to the template image, in order to initially register the template image with respect to the overview image. For instance, a bounding box obtained from the Viola-Jones algorithm can be compared with the template scan region or another reference region, which in this embodiment are also boxes, wherein a rotation of the Viola-Jones box and a scaling of the Viola-Jones box relative to the intermediate scan region or the reference region, respectively, can be used for determining rotation and scaling parameters to be used for initially registering the template image with the overview image. Thus, the position, size and angulation of the box provided by the Viola-Jones algorithm can be used to define the initial translation, scaling and rotation of the registration.

The template image providing unit 15 can be adapted to provide directly a real region on the template image as the template scan region. For instance, coordinates defining this direct template scan region can be provided with respect to the template image. However, the template image providing unit 15 can also be adapted to indirectly define the template scan region by defining the template scan region with respect to positions of template indicator elements, which are preferentially landmarks shown in the template image.

Thus, the template image providing unit 15 can be adapted to provide positions of template indicator elements in the template image 33, wherein the template scan region 34 can be defined with respect to the positions of the template indicator elements. In this case the scan region determination unit 17 can be adapted to project the template scan region 34 onto the overview image 31 by transforming the positions of the template indicator elements by using the determined spatial transformation and by determining the template scan region 34 on the overview image 31 based on the transformed positions of the template indicator elements. The template scan region 34 can be defined with respect to the template indicator elements, which can be regarded as being landmarks, by using corresponding template rules. In this example the template indicator elements are certain parts of the skull, wherein a template scan box can be defined as a template scan region in accordance with template rules which define, for instance, that the upper side of the template scan box is positioned a predefined distance above the most posterior part of the skull, the lower side of the template scan box is positioned a predefined distance below the most inferior part of the skull, the left side of the template scan box is positioned a predefined distance left to the most left part of the skull and the right side of the template scan box is positioned a predefined distance right to the most right part of the skull. The predefined distance is, for instance, 1 cm. The template indicator elements and the template rules can be predefined, for instance, by a medical expert.

Thus, based on the spatial transformation and on the rules used to define the coordinates of the final scan region, i.e. of the final plan box, the template scan region, which may also be regarded as being a reference plan box, as defined on the template image is projected onto the actual overview image, in order to determine the final scan region.

If the template image providing unit 15 provides the template scan region directly on the template image by defining corresponding coordinates of the template scan region with respect to the template image, the scan region determination unit 17 can directly apply the spatial transformation to the coordinates of the template scan region for projecting the template scan region onto the overview image. Thus, in this case it is not necessary to project positions of template indicator elements on the overview image, which then define together with template rules the projected template scan region.

The final scan region 30, which is preferentially a plan box, preferentially defines the spatial extent of the volume to be scanned and/or of a three-dimensional volume image to be reconstructed. It has preferentially a rectangular shape, which can be aligned along the main axis of the computed tomography scanner 10. However, it can also have another shape like a parallelogram shape.

After the final scan region 30 has been determined, the controller 9 can control the acquisition of further detection values such that a computed tomography image can be generated showing the scan region 30. Thus, corresponding detection values can be acquired by the scanning apparatus 14 and used by a reconstruction unit 18 for reconstructing a computed tomography image of the element to be scanned being the brain in this embodiment. For instance, the start z position and the end z position of the projection data acquisition can be defined such that a three-dimensional volume including the determined final scan region can be reconstructed. The reconstruction unit 18 can be adapted to use known computed tomography reconstruction algorithms like a filtered back projection algorithm.

The scanning system 10 further comprises a training apparatus 19 for training the scan region determining apparatus 12. The training apparatus 19 comprises a training images providing unit 20 for providing training images of a subject comprising an element and for providing training scan regions including the element of the subject in the training images. The training apparatus 19 further comprises a training unit 21 for training the element position indicator determination unit 14 based on the provided training images and training scan regions. The training apparatus is used to compute the optimal parameters of the scan region determining apparatus, in particular, to compute the optimal parameters of the Viola-Jones algorithm, which may also be regarded as being a Viola-Jones classifier, by learning from the training images with the training scan regions. This training is performed for each kind of element, for which a scan region should be automatically determined. For instance, if the scan region determining apparatus should be able to determine scan regions for different target organs, the training is performed for each target organ. The training images are preferentially representative computed tomography localizer images, which are typically used for planning the scanning of the respective target organ. Thus, the training images providing unit 20 preferentially provides for each kind of element, in particular, for each target organ, a number of representative computed tomography localizer images. On each of these localizer images a positive training box marking the position and typical extent of the respective target organ is defined, in particular, predefined by an operator trained to this task. These positive training boxes forming, in this embodiment, the training scan regions do not need to correspond to a desired scan region, in particular, do not need to correspond to a desired final plan box. The training scan regions preferentially contain typical image features that are consistently found within the respective kind of element, in particular, within the respective target organ, or possibly in the vicinity of the respective kind of element. Preferentially, similar training scan regions, i.e. in this embodiment similar training boxes, are defined on the training images used for the respective kind of element, wherein training scan regions are similar, if the same image features can be found in these training scan regions. Since it is desired to find the position of the respective element, in particular, of the target organ, also in cases where it is only partially covered by the localizer image, it may be of advantage to use scan regions that cover only a portion of the respective element.

Moreover, in order to train the Viola-Jones algorithm also negative training scan regions, in particular, negative training boxes, can be provided by the training images providing unit, wherein the negative training scan regions contain typical image features found on the localizer images, but which should not be detected by the classifier. Also these negative training scan regions can be predefined by the operator. Regarding further details about the training of the Viola-Jones algorithm reference is made to the above mentioned articles.

The template image may be representative of the localizer images generally used for planning a scan of the respective kind of element by the respective scanning system being, in this embodiment, a computed tomography system. The template image is, for example, a statistical atlas representing the variation in shape and intensity of the localizer images. The statistical atlas can, for example, comprise a mean image and a standard deviation image that are obtained from a plurality of localizer images of the respective kind of element, for instance, of a respective target organ. For determining the statistical atlas preferentially firstly the plurality of localizer images are registered with respect to each other, wherein then, for instance, the mean image and the standard deviation image are calculated. Thus, firstly spatial correspondences between common anatomical landmarks in the set of localizer images may be determined, whereupon the corresponding spatial transformations are applied to the localizer images, before computing voxel-wise statistics. This determination of the template image, in particular, of a mean image and/or a standard deviation image, which may form a statistical atlas, can be performed by the training apparatus 19 or another training device. In the embodiment described above with reference to FIGS. 1 to 5 the template image is the mean image 34 shown in FIG. 4.

If the statistical atlas comprises several images, only one of these images may be used for the registration. However, also several of these images can be used for the registration. If, for instance, the statistical atlas comprises a mean image and a median image, the registration with the overview image may be performed with each one of the mean image and the median image and for the further steps the one of the mean image and the median image can be selected, which provides the best registration result, wherein the registration result can be measured by using known similarity measures. If the statistical atlas comprises a standard deviation image and, for instance, a mean image, the standard deviation image can be used to weight a similarity measure between the overview image and the mean image. For instance, the similarity measure can be the sum of squared differences, wherein the elements of the sum can be weighted in accordance with the standard deviation image and the registration can be performed such that the similarity measure applied to the overview image and the mean image is optimized.

In general the template image can be a reference localizer image for the respective kind of element, in particular, of the respective target anatomy, or a statistical atlas compiled from several representative localizer images.

The template scan region, i.e. particularly a preferred position of a desired plan box for the respective kind of element, can finally be defined on the template image. In particular, the coordinates of the box corners can be defined in the geometry of the template image. Alternatively, the position, size and angulation of the template scan region can be defined based on the position of template indicator elements, which are preferentially anatomical landmarks, in the template image, i.e. template rules can be defined, which encode how to compute the respective plan box geometry based on the positions of the template indicator elements. Also the template indicator elements and the template rules can be predefined manually by a skilled person like an operator trained to perform this task.

The scanning system 10 further comprises an input unit 22 like a keyboard, a mouse, a touchpad, et cetera for inputting commands into the scanning system like commands for initiating the generation of an overview image, the determination of a scan region, the initiation of a computed tomography scan in accordance with the determined scan region, et cetera. The scanning system 10 further comprises a display 23 for displaying, for instance, a reconstructed computed tomography image, a determined scan region on an overview image, et cetera.

For instance, the input unit 22 can be used to allow a user to specify for which one or several elements, in particular, for which one or several organs, one or several scan regions, respectively, should be determined automatically. For example, a graphical user interface can be provided allowing a user to select desired one or several elements shown in an overview image. In an embodiment the scan region determining apparatus may be adapted to automatically detect one or several elements in the overview image, wherein the graphical user interface can allow the user to select one or several of the detected elements. The scan region determining apparatus can also be adapted to allow a user to add one or several parameters to a scan parameter list that defines scans of a certain examination like an overview scan and an actual scan which is based on determined one or several final scan regions. The user may use the input unit 22 for adding the additional parameters to the scan parameter list. These added parameters can be indicative of elements of the subject, in particular, of anatomical parts of a person, for which final scan regions should be determined. The scan parameter list with the added parameters can be stored such that, if the user wants to perform the examination again, the corresponding final scan regions will automatically be determined.

Figure 6:
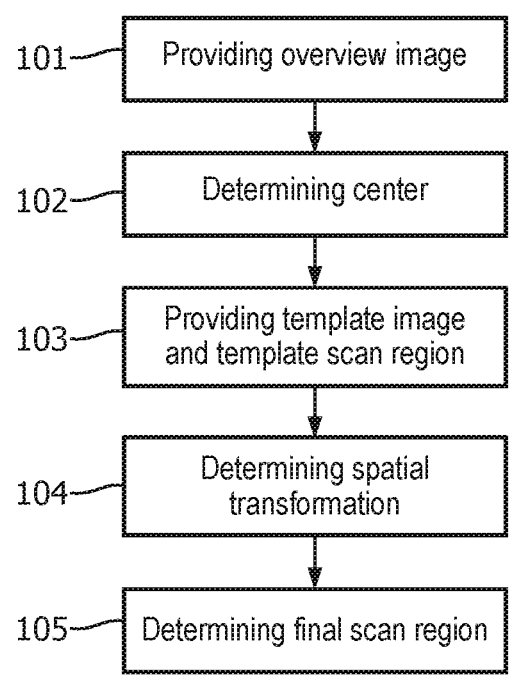
FIG. 6 shows a flowchart exemplarily illustrating an embodiment of a scan region determining method for determining a scan region of a subject to be scanned by the scanning system shown in FIG. 1.

In the following an embodiment of a scan region determining method for determining a scan region of a subject to be scanned by a scanning system will exemplarily be described with reference to a flowchart shown in FIG. 6.

In step 101 an overview image 31 of a subject is provided by the overview image providing unit 13 and in step 102 a center of an element of the subject to be scanned and an intermediate scan region 32 centered on this center of the element and including the element are determined with respect to and based on the overview image 31 by the element position indicator determination unit 14. In particular, a localizer image of an upper part of a person is provided, wherein an intermediate scan region 32 including the brain of the person is determined by the element position indicator determination unit 14. For determining this intermediate scan region fast, preferentially the Viola-Jones algorithm is used, which provides a rough approximation of the position and extension of the brain indicated by the intermediate scan region 32.

In step 103 a template image 33 of a template subject, which corresponds to the subject to be scanned, and a template scan region 34 including a template element, which corresponds to the element of the subject to be scanned, are provided by the template image providing unit 15, wherein the template image providing unit 15 provides a template scan region 34, which is defined with respect to the template image 33. For instance, a mean image can be provided as the template image, wherein the mean image can have been generated by averaging several overview images of, for instance, the upper part of different persons, after these overview images have been registered with respect to each other. A desired template scan region has preferentially been added to the template image manually by an operator trained to add template scan regions to this kind of template images.

In step 104 a spatial transformation defining a registration of the overview image 31 and the template image 33 with respect to each other is determined by the spatial transformation determination unit 16, wherein initially the overview image 31 and the template image 33 are registered based on the determined element position indicator being indicative of the position of the element of the subject to be scanned with respect to the overview image 31, i.e. in this embodiment based on the determined center of the element in the overview image 31 and based on the intermediate scan region. In step 105 a final scan region 30 is determined by projecting the template scan region 34 onto the overview image 31 by using the determined spatial transformation by the scan region determination unit 17.

It should be noted that the steps of the scan region determining method can also be executed in another order. For instance, step 103 can be performed before step 102 or before step 101.

Figure 7:
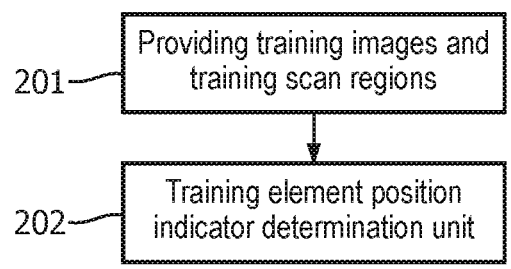
FIG. 7 shows a flowchart exemplarily illustrating a training method for training a scan region determining apparatus of the scanning system shown in FIG. 1.

In the following an embodiment of a training method for training the scan region determining apparatus 12 will exemplarily be described with reference to a flowchart shown in FIG. 7.

In step 201 a) training images of a subject comprising an element and b) training scan regions including the element of the subject on the training images are provided by the training images providing unit 20. In step 202 the element position indicator determination unit 14 is trained based on the provided training images and training scan regions by the training unit 21. In particular, the Viola-Jones algorithm is trained by using the training images and the training scan regions. Optionally the training method can further comprise steps for determining a template image based on provided representative overview images showing a certain kind of an element like a certain target organ.

Figure 8:
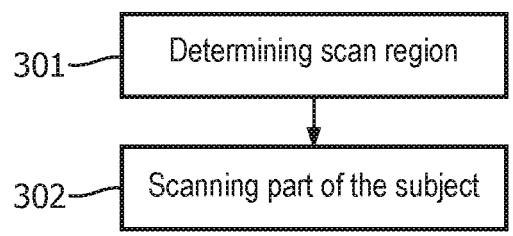
FIG. 8 shows a flowchart exemplarily illustrating a scanning method for scanning a scan region of a subject by using the scanning system shown in FIG. 1.

FIG. 8 shows a flowchart exemplarily illustrating an embodiment of a scanning method for scanning a scan region of a subject.

In step 301 a scan region is determined as described above with reference to FIG. 6 by the scan region determining apparatus 12 and in step 302 a part of the subject defined by the determined scan region 30 is scanned by the scanning apparatus 14. For instance, after a scan region including the brain or another organ has been determined, the scanning apparatus 14 of the computed tomography scanner 10 can be controlled such that an image including the determined scan region is generated.

In known computed tomography procedures a computed tomography technologist defines a plan box on a localizer image, which may also be regarded as being a surview, manually, when planning a scan of a computed tomography examination. The plan-box may be manually edited by using direct manipulations provided by a graphical user interface, which allows a user to move, resize and rotate the plan box.

Typically, when using known computed tomography systems, there is a standard operation procedure, i.e. a guideline, for a given examination type in the radiology department that determines where to place the plan boxes with respect to anatomical landmarks. However, the process of manual editing of plan boxes is time consuming. Frequently, several boxes need to be planned on the same localizer images, one for each target organ. For example, plan boxes for chest, abdomen and pelvis may need to be separately planned in a CAP (Chest-Abdomen-Pelvis) examination. Besides, even if guidelines are in place in a particular radiology department, a high variability can be observed between different operators, depending on their individual skills and experience. Hence, manual planning is a potential source of inconsistency between different operators, which reduces the quality and efficiency of a radiology department. Finally, errors in manual planning have an incidence on the amount of radiation dose received by a patient. If plan boxes are set too large with respect to the target anatomy, anatomical parts are unnecessary exposed to radiation. On the contrary, if the plan box is set too short, diagnosis relevant features may be missed and the scan may need to be repeated, which is time consuming and causes additional exposure to radiation. The scan region determination apparatus described above with reference to FIG. 1 provides therefore an automatic planning algorithm that speeds up the planning procedure, improves the consistency and efficiently minimizes exposure to radiation in computed tomography examinations. Coordinates of one or several plan boxes of a single or multiple target organs on a computed tomography localizer image are automatically computed to enable automated planning of computed tomography scans.

The step of determining the intermediate scan region 32 is relatively fast, i.e. it can be in the order of one second, because this step aiming at gross organ detection with the Viola-Jones algorithm requires only a few milliseconds on a standard personal computer, and very fast registration algorithms, such as affine registration algorithms, are available for two-dimensional images. Moreover, the automatic determination of the scan region is applicable to a wide range of elements, in particular, to a wide range of target organs, because the proposed approach is fully generic and does not rely on dedicated assumptions for each element, as opposed to algorithms relying on landmark detection.

The scanning system described above with reference to FIG. 1 makes use of an image classifier that needs to be trained, i.e. the Viola-Jones algorithm, a template image that needs to be computed like the mean image and a plan box definition rule, i.e. the template rules. Hence, a training module is provided, i.e. the training apparatus, used in the development phase of the scan region determination algorithm, and a planning module, i.e. the scan region determination apparatus, used in the application of the scan region determination algorithm. The training module and the planning module can also be implemented as computer programs, wherein at least the planning module can be a part of a computed tomography planning software of a computed tomography system, which computes the position of the plan box after the acquisition of a computed tomography localizer image.

The planning module may be adapted to receive as input the localizer image and a list of target organs for which plan boxes are desired. In a preferred embodiment the list of target organs is saved as parameter in a scan protocol that is used by a computed tomography technologist. In this manner, the computed tomograpy technologist has the possibility to associate to each scan of a computed tomography examination one or more target organs and to save this information for later use.

Although in the embodiment described above with reference to FIG. 1 the scan region determining apparatus 12 and the training apparatus 19 are components of the data processing apparatus 11 of the computed tomography scanner 10, in other embodiments the scan region determining apparatus and/or the training apparatus can also be separate apparatuses. For instance, the scan region determining apparatus and/or the training apparatus can each be standalone systems or they can be combined in a single system, wherein the overview image providing unit of the scan region determining apparatus and the training images providing unit of the training apparatus receive corresponding images from another device, for instance, from a computed tomography system.

Although in above described embodiments the overview image is a two-dimensional projection image, the overview image can also be another kind of image. For instance, the overview image can be a three-dimensional image like a three-dimensional low-dose image. Moreover, the overview image can be a three-dimensional reformat computed from a three-dimensional image, it can be a digitally reconstructed radiograph computed from a three-dimensional image et cetera. The overview image can also comprise several sub overview images, for instance, it can comprise at least two projection images, which have been acquired in different acquisition directions. If the overview image comprises at least two sub overview images, the template image providing unit can be adapted to provide at least two corresponding sub template images and at least two sub template scan regions, wherein the element position indicator determination unit can determine element position indicators for each of the sub overview images and wherein the spatial transformation determination unit can determine for each sub overview image and corresponding sub template image a spatial transformation. The scan region determination unit can finally determine final scan regions in the at least two sub overview images by projecting the respective template scan region onto the respective sub overview image by using the determined respective spatial transformation.

Although in an above described embodiment the template image is a statistical atlas comprising a mean image and/or a standard deviation image, the statistical atlas can also comprise other images like a median image or a mode image. A mode image can be determined from a series of images by taking for each voxel the image intensity which appeared the most often.

Although in above described embodiments the Viola-Jones algorithm has been used for determining the intermediate scan region, i.e., for instance, an initial plan box, in other embodiments other object detection algorithms can be used for detecting an object in the overview image, wherein then an intermediate scan region can be defined such that it includes the detected object. Alternative approaches include voting like approaches such as the Generalized Hough Transform (cf, for instance, D. H. Ballard, "Generalizing the Hough Transform to Detect Arbitrary Shapes" Pattern Recognition 123 (2), pages 111 to 122 (1981)) or other variants of sliding window like techniques (cf, for instance, P. F.

Felzenszwalb, R. B. Girshick D. McAllester and D. Ramanan, "Object Detection with Discriminatively Trained Part Based Models", IEEE Transactions on Pattern Analysis and Machine Intelligence 32 (9) pages 1627-1645 (2010)).

Although in the above described embodiments the scanning system is an x-ray computed tomography system, in other embodiments the scanning system can also be another system, which may use an overview image for determining a scan region, like an x-ray C-arm system, a nuclear imaging system like a positron emission tomography system or a single photon emission computed tomography system, a magnetic resonance imaging system, a combined system combining several imaging modalities like a system combining x-ray computed tomography with positron emission tomography or with single photon emission computed tomography.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of an intermediate scan region, the determination of a spatial transformation, the determination of a final scan region, the reconstruction of an image, et cetera performed by one or several units or devices can be performed by any other number of units or devices. For example, steps 101 to 105 can be performed by a single unit or by any other number of different units. These procedures and/or the control of the scan region determining apparatus in accordance with the scan region determining method and/or the control of the training apparatus in accordance with the training method and/or the control of the scanning system in accordance with the scanning method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a scan region determining apparatus for determining a scan region of a subject to be scanned by a scanning system like a computed tomography system. A spatial transformation defining a registration of an overview image and a template image with respect to each other is determined, wherein initially the overview image and the template image are registered by using an element position indicator being indicative of a position of an element of the subject with respect to the overview image. A template scan region is defined with respect to the template image, wherein a final scan region is determined by projecting the template scan region onto the overview image by using the determined spatial transformation. The registration and thus the determination of the spatial transformation are very robust, which improves the quality of determining the final scan region.

The invention claimed is:

1. A scan region determining apparatus for determining a scan region of a subject to be scanned by a scanning system, the scan region determining apparatus comprising:
   an overview image providing unit configured to provide an overview image of a subject,
   an element position indicator determination unit configured to determine an intermediate scan region being indicative of a position of an element of the subject to be scanned, wherein the element position indicator determination unit is adapted to determine the intermediate scan region with respect to and based on the overview image, wherein the intermediate scan region is an intermediate scan region plan box,
   a template image providing unit configured to provide a template image of a template subject, which corresponds to the subject to be scanned, and for providing a template scan region including a template element, which corresponds to the element of the subject to be scanned, wherein the template image providing unit is adapted to provide a template scan region, which is defined with respect to the template image, wherein the template scan is a template scan region plan box,
   spatial transformation determination unit configured to determine a spatial transformation defining a registration of the overview image and the template image with respect to each other, wherein initially the overview image and the template image are registered by using the determined intermediate scan region being indicative of the position of the element of the subject to be scanned with respect to the overview image,
   a scan region determination unit configured to determine a final scan region by projecting the template scan region onto the overview image by using the determined spatial transformation, wherein the final scan region is a final scan region plan box.

2. The scan region determining apparatus as defined in claim 1, wherein the element position indicator determination unit is adapted to determine at least a center of the element in the overview image as the element position indicator.

3. The scan region determining apparatus as defined in claim 2, wherein the spatial transformation determination unit is adapted to initially register the overview image and the template image with respect to each other by centering the template image on the determined center of the element in the overview image.

4. The scan region determining apparatus as defined in claim 1, wherein the element position indicator determination unit is adapted to use a Viola-Jones algorithm for determining the intermediate scan region.

5. The scan region determining apparatus as defined in claim 1, wherein the element position indicator determination unit is adapted to:
   use an element position indicator determination algorithm for determining the element position indicator,
   provide element position indicator determination rules for selecting a most likely element position indicator, if the element position indicator determination algorithm revealed several possible element position indicators, and
   apply the element position indicator determination rules to the determined several possible element position indicators for determining the element position indicator to be used by the spatial transformation unit.

6. The scan region determining apparatus as defined in claim 1, wherein the spatial transformation determination unit is adapted to apply an intensity based registration algorithm to the overview image and the template image for determining the spatial transformation, wherein the image intensity based registration algorithm is initialized based on the determined intermediate scan region being indicative of the position of the element of the subject to be scanned with respect to the overview image.

7. The scan region determining apparatus as defined in claim 1, wherein the template image providing unit is adapted to provide a position of a template indicator element in the template image, wherein the template scan region is defined with respect to the position of the template indicator element, and wherein the scan region determination unit is adapted to project the template scan region onto the overview image by transforming the position of the template indicator element by using the determined spatial transformation and determining the template scan region on the overview image based on the transformed position of the template indicator element.

8. The scan region determining apparatus as defined in claim 1, further comprising:
a training images providing unit for providing training images of a subject comprising an element and for providing training scan regions including the element of the subject in the training images,
a training unit for training the element position indicator determination unit based on the provided training images and training scan regions.

9. A scan region determining method for determining a scan region of a subject to be scanned by a scanning system, the scan region determining method comprising:
providing an overview image of a subject by an overview image providing unit,
determining an intermediate scan region being indicative of a position of an element of the subject to be scanned by an element position indicator determination unit, wherein the element position indicator determination unit determines the intermediate scan region with respect to and based on the overview image, wherein the element position indicator is an intermediate scan region plan box,
providing a template image of a template subject, which corresponds to the subject to be scanned, and providing a template scan region including a template element, which corresponds to the element of the subject to be scanned, by a template image providing unit, wherein the template image providing unit provides a template scan region, which is defined with respect to the template image, wherein the template scan is a template scan region plan box,
determining a spatial transformation defining a registration of the overview image and the template image with respect to each other by a spatial transformation determination unit, wherein initially the overview image and the template image are registered by using the determined intermediate scan region being indicative of the position of the element of the subject to be scanned with respect to the overview image,
determining a final scan region by projecting the template scan region onto the overview image by using the determined spatial transformation by a scan region determination unit, wherein the final scan region is a final scan region plan box.

10. The scan region determining method as defined in claim 9, further comprising:
determining at least a center of the element in the overview image as the element position indicator.

11. The scan region determining method as defined in claim 10, further comprising:
registering the overview image and the template image with respect to each other by centering the template image on the determined center of the element in the overview image.

12. The scan region determining method as defined in claim 9, further comprising:
employing a Viola-Jones algorithm for determining the intermediate scan region.

13. The scan region determining method as defined in claim 9, further comprising:
using an element position indicator determination algorithm for determining an element position indicator,
providing element position indicator determination rules for selecting a most likely element position indicator, if the element position indicator determination algorithm revealed several possible element position indicators, and
applying the element position indicator determination rules to the determined several possible element position indicators for determining the element position indicator to be used by a spatial transformation unit.

14. The scan region determining method as defined in claim 9, further comprising:
applying an intensity based registration algorithm to the overview image and the template image for determining the spatial transformation, wherein the image intensity based registration algorithm is initialized based on the determined intermediate scan region being indicative of the position of the element of the subject to be scanned with respect to the overview image.

15. The scan region determining method as defined in claim 9, further comprising:
providing a position of a template indicator element in the template image, wherein the template scan region is defined with respect to the position of the template indicator element;
projecting the template scan region onto the overview image by transforming the position of the template indicator element by using the determined spatial transformation; and
determining the template scan region on the overview image based on the transformed position of the template indicator element.

16. The scan region determining method as defined in claim 9, further comprising:
providing training images of a subject comprising an element and for providing training scan regions including the element of the subject in the training images, and
training the element position indicator determination unit based on the provided training images and training scan regions.

17. A non-transitory computer readable medium encoded with computer executable instructions for determining a scan region of a subject to be scanned by a scanning system which when executed by a processor of a computer causes the computer to:
create an intermediate scan region plan box in an overview image;
retrieve a template image having a template plan box;
register the overview image and the template image based on the intermediate scan region plan box, creating a spatial transformation there between; and determine a final scan plan box in the overview image by projecting the template plan box onto the overview image using the spatial transformation.

18. The non-transitory computer readable medium of claim 17, wherein the instructions further causes the computer to:
determine at least a center of the element in the overview image as the element position indicator.

19. The non-transitory computer readable medium of claim 18, wherein the instructions further causes the computer to:
initially register the overview image and the template image with respect to each other by centering the template image on the determined center of the element in the overview image.

20. The non-transitory computer readable medium of claim 17, wherein the instructions further causes the computer to:
apply an intensity based registration algorithm to the overview image and the template image to determine the spatial transformation, wherein the image intensity based registration algorithm is initialized based on the determined intermediate scan region being indicative of the position of the element of the subject to be scanned with respect to the overview image.

* * * * *